Jan. 30, 1940. I. A. CANTOR 2,188,622
PHOTOGRAPHIC ENLARGING APPARATUS
Filed Aug. 27, 1938 2 Sheets-Sheet 1
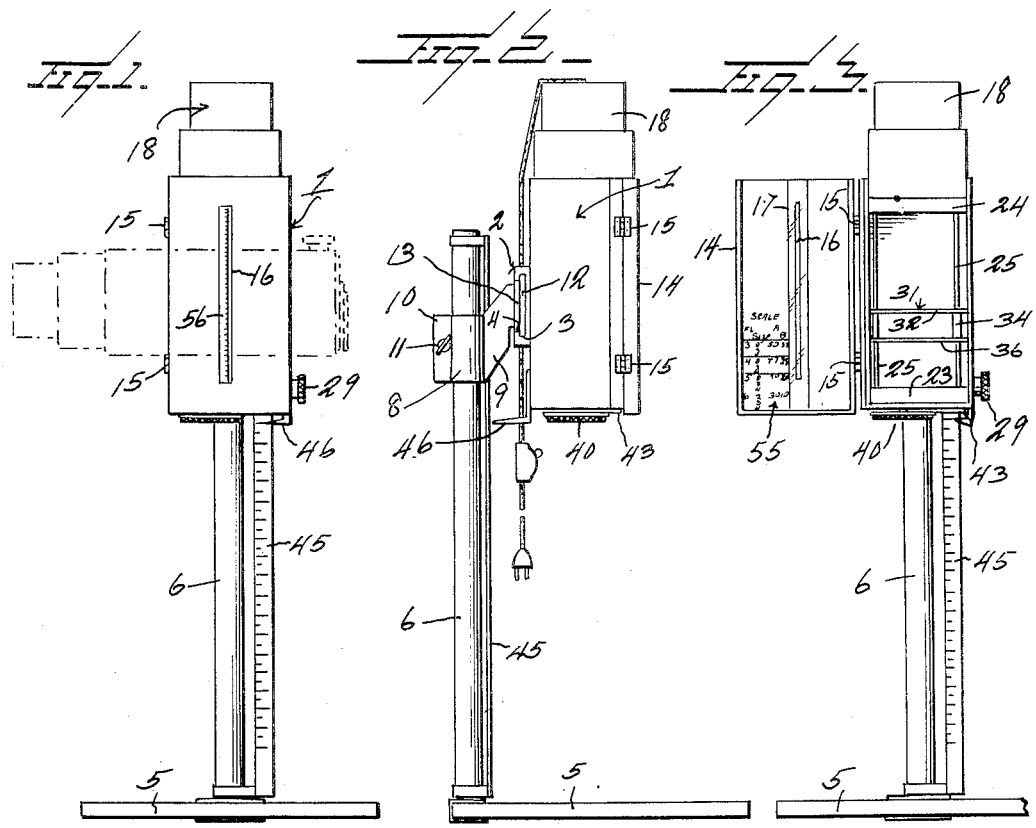
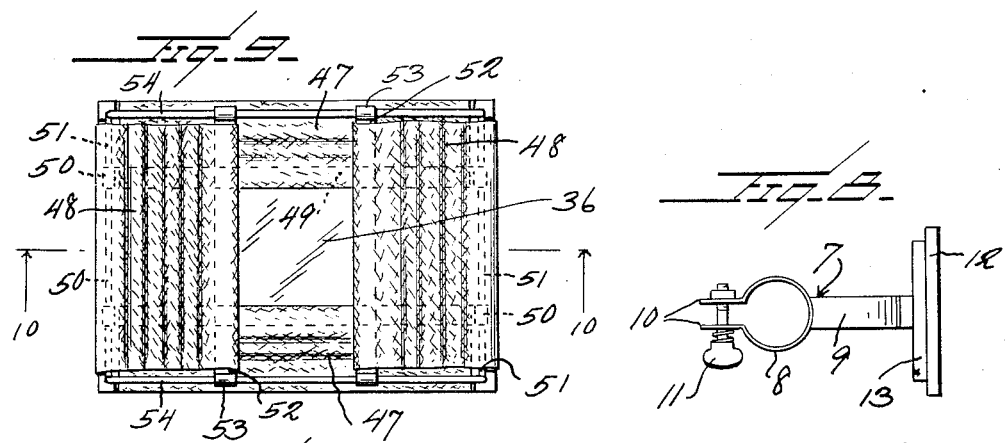
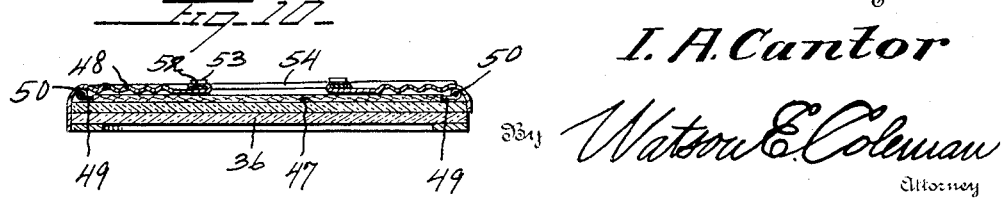
Inventor
I. A. Cantor
By Watson E. Coleman
Attorney Jan. 30, 1940.  I. A. CANTOR  2,188,622
PHOTOGRAPHIC ENLARGING APPARATUS
Filed Aug. 27, 1938   2 Sheets-Sheet 2
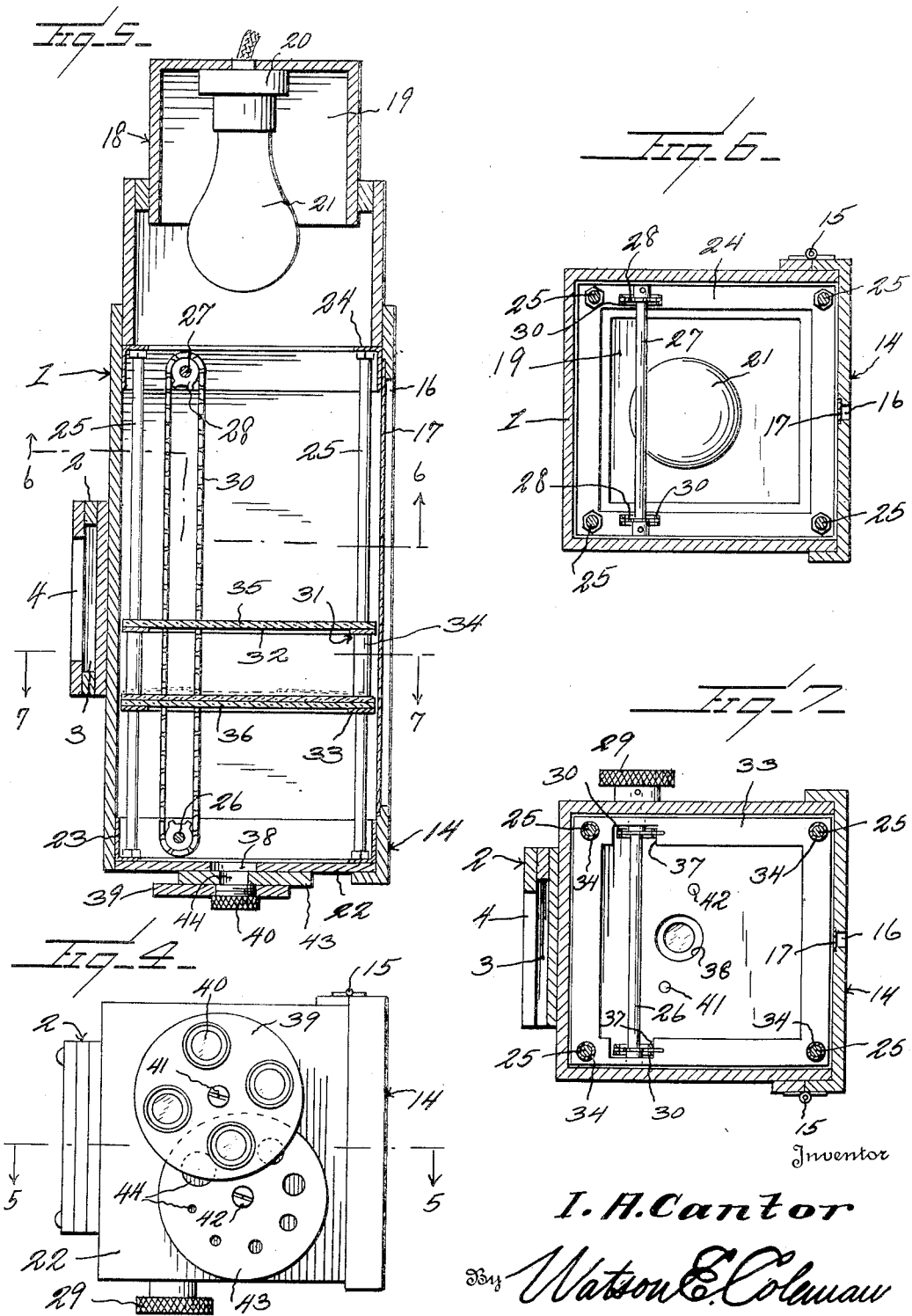
Inventor
I. A. Cantor
By Watson E. Coleman
Attorney Patented Jan. 30, 1940

2,188,622

UNITED STATES PATENT OFFICE 2,188,622

PHOTOGRAPHIC ENLARGING APPARATUS

Irvin A. Cantor, New York, N. Y.

Application August 27, 1938, Serial No. 227,191

4 Claims. (Cl. 88—24)

This invention relates to the class of photography and pertains particularly to improvements in photographic enlarging devices.

As is well known, in the making of photographic enlargements of determined sizes, three important factors are involved which must be taken into consideration in order that satisfactory results may be obtained, which are, the focal length of the lens of the enlarging device, the distance between the lens and the negative which is to be enlarged, and the distance between the lens and the easel or surface upon which rests the sensitized paper which receives the light rays projected through the negative. These distances must be extremely accurately determined and the obtaining of these distances, or the focusing, requires ordinarily a great deal of time, effort and experience.

As is also well known, another important factor is the diffusion of light and the necessity for the light to fall evenly on all parts of the sensitized paper. Owing to the curvature of an electric light bulb, the usual opal and ground glass diffusion system is unsatisfactory because the center part of the bulb, being closer to the diffusion glasses, causes a greater degree of light intensity on the center of the glasses. When the distance between the bulb and the diffusion glasses is increased, the light emanating from the bulb is dispersed, spread out and diffused before it strikes the glasses, thus causing the illumination to be even and the light rays parallel. To increase this distance between the light source and the diffusion glasses to a maximum degree, and at the same time allow the negative to be moved within a comparatively large radius, it is necessary to provide for the diffusion glasses to move with the negative carrier.

The present invention has for its primary object to provide an apparatus by which the above specified factors may be easily and quickly determined and by which the focusing of the lens of the apparatus may be easily accomplished by the provision of a movable negative carrying platform and diffusion glasses which may be brought into any predetermined relation with or to any predetermined distance from the focusing lens.

A further object of the invention is to provide in an enlarging apparatus, a plurality of lenses supported upon a shiftable carrier whereby any one thereof may be brought into operative position and to provide in association with the lenses a plurality of stop apertures formed in a shiftable body so that any one of the apertures may be brought into desired position with respect to a selected lens, in accordance with the size of opening required.

Still another object of the invention is to provide in an enlarging apparatus a novel negative carrier which is designed to overcome the undesirable features commonly associated with the transmission of light from the source to and through the negative or the diffusion means commonly employed by providing a diffuser having a spaced relation with the negative holder and coupled therewith whereby the negative may be moved relative to the light source and the light rays properly diffused over and through the negative instead of being concentrated in the central part thereof as they are with the usual opal and ground glass diffusion system.

Still another object of the invention is to provide a negative carrier having a novel "masking out" means associated therewith whereby portions of a negative which are not to be reproduced may be covered, thus eliminating the usual method of covering the part of the negative which is to be cut out, by a piece of black paper or other material, the present masking device being adjustable to any size of negative.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in front elevation of the apparatus embodying the present invention, the cabinet being shown in dotted outline in a horizontal position in which it may be placed.

Fig. 2 is a view in side elevation of the apparatus.

Fig. 3 is a view in front elevation with the door of the cabinet open.

Fig. 4 is a view of the bottom of the cabinet.

Fig. 5 is a vertical section on the line 5—5 of Fig. 4.

Fig. 6 is a horizontal section on the line 6—6 of Fig. 5.

Fig. 7 is a horizontal section on the line 7—7 of Fig. 5.

Fig. 8 is a detailed view of the cabinet supporting bracket.

Fig. 9 is a view in plan of the adjustable masking device.

Fig. 10 is a sectional view on the line 10—10 of Fig. 9.

Referring now more particularly to the drawings, the numeral 1 designates generally the cabinet of the enlarging device, the back wall of which carries a bracket plate receiving socket 2 which is in the form of a flat body having a chamber 3 therein which is open at one side and at the back, as shown in Fig. 5, the back opening being indicated by the numeral 4 and being of smaller size than the chamber.

The numeral 5 designates a platform or easel upon which sensitized paper is placed to receive light rays from the projector cabinet 1 as hereinafter described, and the easel or platform has secured thereto at one side and extending upwardly therefrom the post or standard 6.

The numeral 7 generally designates a bracket having a split ring or split sleeve 8 secured to an arm 9 and provided with the spaced ears 10 through which a securing or binding screw 11 passes. The sleeve is adapted to encircle the post 6 and to be tightened thereon by the screw 11 so that the arm 9 will be maintained in vertically adjusted position on the post.

The arm 9 is integral with and carries the bracket plate 12 which is perpendicular to the arm and parallel with the post 6 and is adapted to be positioned in the plate socket receiving chamber 3, being inserted thereinto through the said side edge opening. The outer side of the plate 12 is integral with the smaller plate 13 which fits snugly in the open area 4. Thus the cabinet may be firmly coupled with the bracket 7 and it will be readily apparent that when the socket is arranged with the open edge directed horizontally the cabinet will be vertically disposed and by directing the socket edge opening downwardly in coupling it with the plate 12, the cabinet 1 will be horizontally disposed. In vertical position, the cabinet will be perpendicular with respect to the easel 5 and in horizontal position, it will be parallel with the easel and perpendicular to a wall surface adjacent which it may be placed with the lower end directed toward the same.

The front of the cabinet has a door opening covered by the door 14, this door really constituting the front wall of the cabinet. The door is hingedly attached to the side wall of the cabinet as indicated at 15, so that it may be swung laterally to give access to the interior of the cabinet. The central part of the door is provided with a vertical slit 16 which is covered by a ruby glass panel 17.

The top part of the cabinet is pyramided, as indicated at 18, providing in the extreme top portion the chamber 19 in which an electric light socket 20 is secured so that an electric incandescent lamp 21 mounted in the socket will be directed downwardly to project its light rays toward the bottom 2 of the cabinet structure.

In the lower part of the cabinet, a reinforcing frame 23 is secured which is in opposed parallel relation with a similar frame 24 in the top part of the cabinet and the four corners of these frames are connected by the vertical fixed posts 25. The lower and upper fixed frames or reinforcing frames 23—24 carry respectively the lower and upper transverse shafts 26 and 27 which are in vertically spaced parallel relation and each shaft carries a pair of sprocket wheels 28. One of the shafts, such as the lower shaft 26, extends to the outer side of the cabinet and has secured thereto the knob 29 by which its rotation may be effected. The vertically spaced or vertically separated sprocket wheels 28 of the upper and lower shafts are connected by endless chains 30.

Extending transversely of the interior of the cabinet is a movable platform generally designated by the numeral 31 and made up of the upper and lower open rectangular frames 32 and 33, respectively, which have their corners apertured for the passage therethrough of the corner posts 25, as shown in Fig. 7, and these frames are maintained in vertically spaced parallel relation by the spacing sleeves 34 which encircle the posts 25 between the frames 32 and 33. The upper frame 32 of the platform constitutes a carrier for a light diffusion plate 35 while the lower frame 33 constitutes a carrier for the two transparent negative carrying plates 36. The spaced frames 32 and 33 of the movable platform are recessed, as indicated at 37, to permit the passage of the endless chains 30 and each of these endless chains has one of the vertical runs thereof secured to the lower frame 33 of the platform so that as the chains are moved by turning the knob 29, the platform will be raised and lowered.

The lower wall 22 of the cabinet is provided with an aperture 38 which is alined with the light bulb 21 and pivoted to the underside of the wall 22 is a plate or disk 39 which carries a series of lenses 40 each having a different focal length. This disk or plate 39 is pivotally attached to the wall by the screw 41 or by any other suitable attaching means and is arranged with respect to the opening 38 so that any one of the lenses 40 may be brought into position over this opening.

Adjacent the plate 39 there is pivotally attached to the wall 22 by means of the pivotal member 42, a stop aperture disk 43 having stop apertures 44 of different sizes therein, the disk being located with respect to the opening 38 so that any one of the apertures 44 may be brought into position between the opening 38 and a lens 40.

Secured to and in parallel relation with the standard 6 is a scale strip 45 having suitable scale markings thereon which may be numbered or otherwise identified so as to be correlated with a chart such as hereinafter described. The cabinet 1 is provided with a pointer 46 which is directed toward the vertical scale 45 and facilitates in positioning the cabinet at the proper height above the easel 5 according to a selected indication upon the scale.

Figs. 9 and 10 designate a "masking out" device which may be used in association with the negative carrier plates 36 of the movable platform. This device makes use of or consists of four flexible sheets or strips of material such as a suitable black fabric which will not transmit light and these strips are in pairs, one pair such as the two strips indicated by the numeral 47 being secured by cementing or in any suitable manner along the longitudinal edges of the lower one of the plates 36, while the other two strips, each of which is indicated by the numeral 48, are secured along the transverse edges of the plates 36, one being secured to the transverse edge of the lower plate and the other to the transverse edge of the top plate, as shown in Fig. 10. The strips 47 lie beneath the strips 48 and have those edges opposite from the edges which are secured to the plates, attached to suitable metal bars 49, each of which terminates in a ring or eye 50 at each end, and the adjacent eyes of these bars 49 are coupled together by the rods 51 which pass therethrough and upon which the eyes 50 are slidably supported.

The inner or adjacent edges of the strips 48 are also attached to bar members 52, each of which terminates at each end in an eye 53 and the adjacent or opposed eyes of these bars 52 have extended therethrough the supporting or guiding rods 54 upon which they slide. Thus it will be seen that the fabric strips 47 may have their adjacent edges moved inwardly or outwardly with respect to the longitudinal edges of the plates 36 and the strips 48 may have their adjacent edges moved similarly with respect to the transverse edges of the plates so that any undesired portion of a negative held between the plates 36 may be covered and be prevented from being printed as the curtains will cut off the light rays from passing through the portions of the negative over which they lie and permit the rays to pass through only that portion of the negative which it is desired to print.

Upon the inner side of the door 14, a chart 55 is placed, giving in a vertical column the focal lengths of the lenses 40, and two scales of values corresponding to the values appearing upon the scale 45 and the scale 56 which is associated with the slit 16 which is formed through and vertically of the door 14. By means of this chart, there will be given in association with each lens certain scale values designating the height at which the cabinet must be adjusted on the standard 6 with respect to the sensitized paper supporting easel 5, and the height or position at which the movable platform may be located in the cabinet with respect to the lens or, in other words, the distance which the negative carried by the platform must be positioned from the lens selected. By this scale or chart, the proper relative positions of the negative, lens and sensitized paper on the easel may be determined to be used with these other factors. By the provision of the ruby glass 17 over the opening 16 of the door of the cabinet, the operator is able to control the movement of the negative carrier from the outside of the cabinet without exposing the negative to outside light as it would be necessary for him to do if he had to open the door to adjust the carrier. The position of the carrier can be seen through the glass and as he moves the carrier up and down by rotating the knob 29, the proper position of the carrier can be determined with regard to the scale 56 adjacent the opening 16.

From the foregoing, it will be readily apparent that the photographic enlarging apparatus herein described will greatly facilitate the making of enlargements as by its use perfect enlargements may be obtained by persons of little skill and experience and also the time and effort required for making the enlargements will be greatly reduced as the several necessary factors may be readily obtained and the several parts of the apparatus set accurately with a minimum of effort.

What is claimed is:

1. A photographic enlarging apparatus, comprising a sensitized paper support, a light projecting unit consisting of an elongated vertically disposed cabinet having a lower wall provided with an aperture and a light source in the upper part thereof, means supporting the cabinet for vertical movement relative to said support, a plurality of lenses supported by the lower part of the cabinet for selective movement into registry with said opening, a negative carrier within the cabinet between said light source and said aperture and mounted for vertical movement in the cabinet, and scale means for correlating the lens covering said aperture with said paper support and for correlating the negative carrier with respect to the lens whereby the relative positions of the negative, lens and sensitized paper may be accurately obtained.

2. A photographic enlarging apparatus, comprising a sensitized paper support, a light projector consisting of an elongated cabinet arranged vertically above said support and having a light source in its upper part and a light emitting opening directed downwardly toward the support, a plurality of vertically arranged rigid guides within the cabinet, a movable negative carrier consisting of a transparent negative support interposed between the light source and said light emitting opening, a frame overlying said support, guide sleeves coupling the frame and negative support together and slidable on said guides, a light diffuser on said frame in parallel relation with said transparent negative support and above and between the same and the light source, means for shifting said negative support and light diffuser on the guides comprising an endless flexible element extending longitudinally within the cabinet at one side of and connected with the frame and support, rotatable supports for and at the end of said element, means for turning one of said supports from outside the cabinet, and a lens overlying said light emitting opening.

3. A photographic enlarging apparatus, comprising a sensitized paper support, a standard adjacent to and in perpendicular relation with the support, a light projector unit comprising a cabinet having a lower wall provided with a light emitting opening and a light source in the upper part thereof, means securing said cabinet to said standard facilitating the vertical adjustment of the cabinet on the standard, a negative carrier disposed within the cabinet between the light source and said aperture, a lens covering said aperture, and means for moving said negative carrier relative to said aperture to vary the distance between the same and a negative on the carrier, the said means securing the cabinet with the standard further including slidably interconnected plate and socket elements, one of said elements being permanently secured to the cabinet and the other being carried by the standard engaging portion of the securing means, the plate and socket being adapted for connection in two relative positions whereby the cabinet may be disposed vertically or horizontally.

4. In a photographic enlarging apparatus, a sensitized paper support, a standard disposed vertically on said support, an elongated cabinet of fixed length having a light source in the upper part thereof and a light emitting aperture in the opposite end wall, means for attaching said cabinet in vertical position to said standard, a plurality of rigid guides disposed longitudinally within the cabinet, a negative carrying platform disposed across the cabinet and having slidable connection with said guides, said cabinet having one side wall hingedly attached to provide a door, a sight opening in said door in the form of a narrow slot extending longitudinally thereof, a ruby glass covering said slot, a scale disposed along one longitudinal edge of said slot, a scale disposed longitudinally of said standard and fixed with respect to the same, a pointer carried by the cabinet for movement relative to said last scale, means for shifting said platform longitudinally in the cabinet, and a plurality of lenses mounted upon the lower end of the cabinet for selective disposition before said light opening, the said scales facilitating the correlating of a lens with the sensitized paper support and the negative carrier with respect to the lens whereby the relative positions of such parts may be accurately obtained.

IRVIN A. CANTOR.